United States Patent
Chen et al.

(10) Patent No.: US 9,642,180 B2
(45) Date of Patent: May 2, 2017

(54) MAPPING AN ENHANCED PHYSICAL DOWNLINK CONTROL CHANNEL

(75) Inventors: Xiaogang Chen, Beijing (CN); Yuan Zhu, Chao Yang District (CN); Qinghua Li, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 523 days.

(21) Appl. No.: 13/994,113

(22) PCT Filed: Dec. 20, 2011

(86) PCT No.: PCT/US2011/066166
§ 371 (c)(1),
(2), (4) Date: Jan. 13, 2014

(87) PCT Pub. No.: WO2013/006198
PCT Pub. Date: Jan. 10, 2013

(65) Prior Publication Data
US 2014/0126487 A1 May 8, 2014

Related U.S. Application Data

(60) Provisional application No. 61/504,054, filed on Jul. 1, 2011.

(51) Int. Cl.
*H04L 5/00* (2006.01)
*H04W 76/04* (2009.01)
(Continued)

(52) U.S. Cl.
CPC ........ *H04W 76/048* (2013.01); *H04B 7/0697* (2013.01); *H04B 15/00* (2013.01);
(Continued)

(58) Field of Classification Search
CPC . H04W 76/048; H04W 72/082; H04W 88/06; H04W 72/1278; H04W 24/08; H04W 52/242; H04L 1/0038
See application file for complete search history.

(56) References Cited

U.S. PATENT DOCUMENTS

| | | | |
|---|---|---|---|
| 2009/0209247 A1 | 8/2009 | Lee et al. | |
| 2010/0195583 A1* | 8/2010 | Nory | H04L 1/1854 370/329 |
| 2011/0044391 A1* | 2/2011 | Ji | H04L 5/0007 375/260 |

FOREIGN PATENT DOCUMENTS

| | | |
|---|---|---|
| JP | 2012-235353 A | 11/2012 |
| KR | 10-2011-0020732 A | 3/2011 |

(Continued)

OTHER PUBLICATIONS

LG Electronics, "An Overview on R-PDCCH Design", 3GPP TSG RAN WG1 Meeting #62 R1-104650, Aug. 2010, pp. 7, Agenda #6.6, Madrid, Spain.

(Continued)

*Primary Examiner* — Thai Nguyen
(74) *Attorney, Agent, or Firm* — Thorpe North & Western

(57) ABSTRACT

Technology for mapping an enhanced physical downlink control channel to physical resource blocks in a radio frame is disclosed. One method comprises mapping modulated symbols in the ePDCCH to at least one control channel element. The at least one control channel element can be mapped to resource elements located in a plurality of distributed physical resource blocks in a subframe, wherein each resource block is separated by at least one additional resource block in the subframe. The mapping can also be to resource elements distributed in a single resource block in the subframe, wherein the control channel element is (Continued)

mapped to be distributed in frequency and time relative to other mapped resource elements in the single resource block.

21 Claims, 6 Drawing Sheets

(51) Int. Cl.

| | | |
|---|---|---|
| H04W 72/12 | (2009.01) | |
| H04W 72/08 | (2009.01) | |
| H04W 88/06 | (2009.01) | |
| H04B 7/06 | (2006.01) | |
| H04L 1/06 | (2006.01) | |
| H04W 72/04 | (2009.01) | |
| H04B 15/00 | (2006.01) | |
| H04W 8/02 | (2009.01) | |
| H04W 24/00 | (2009.01) | |
| H04W 52/24 | (2009.01) | |
| H04W 52/02 | (2009.01) | |
| H04L 27/34 | (2006.01) | |
| H04L 5/14 | (2006.01) | |
| H04W 4/00 | (2009.01) | |
| H04W 72/02 | (2009.01) | |
| H04W 76/02 | (2009.01) | |
| H04W 52/14 | (2009.01) | |
| H04W 24/08 | (2009.01) | |
| H04L 27/36 | (2006.01) | |
| H04L 1/00 | (2006.01) | |
| H04W 52/32 | (2009.01) | |
| H04W 84/04 | (2009.01) | |

(52) U.S. Cl.
CPC .......... *H04L 1/0038* (2013.01); *H04L 1/0041* (2013.01); *H04L 1/0045* (2013.01); *H04L 1/06* (2013.01); *H04L 5/0037* (2013.01); *H04L 5/14* (2013.01); *H04L 27/34* (2013.01); *H04W 4/005* (2013.01); *H04W 8/02* (2013.01); *H04W 24/00* (2013.01); *H04W 24/08* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/242* (2013.01); *H04W 52/244* (2013.01); *H04W 72/02* (2013.01); *H04W 72/04* (2013.01); *H04W 72/042* (2013.01); *H04W 72/082* (2013.01); *H04W 72/1215* (2013.01); *H04W 72/1278* (2013.01); *H04W 76/028* (2013.01); *H04W 88/06* (2013.01); *H04L 1/0025* (2013.01); *H04L 27/362* (2013.01); *H04W 52/325* (2013.01); *H04W 84/042* (2013.01); *Y02B 60/50* (2013.01)

(56) References Cited

FOREIGN PATENT DOCUMENTS

| | | |
|---|---|---|
| WO | 2010/053984 A2 | 5/2010 |
| WO | WO 2010/053984 A2 | 5/2010 |
| WO | WO 2011/037439 A2 | 3/2011 |
| WO | WO 2011/136523 A2 | 11/2011 |
| WO | WO 2012/107631 A1 | 8/2012 |
| WO | WO 2012/109542 A1 | 8/2012 |
| WO | 2013/006198 A1 | 1/2013 |

OTHER PUBLICATIONS

Nokia et al, "On Enhanced Downlink Control Signaling for Rel-11", 3GPP TSG RAN WG1 Meeting #65 R1-111743, May 2011, pp. 3, Agenda #6.3.2.2, Barcelona, Spain.
Nortel Networks, "Control Channel Design for the Support of Wider Bandwidth for LTE-Advanced", TSG-RAN1 #56bis R1-091395, Mar. 2009, pp. 10, Agenda #15.4, Seoul, South Korea.
Office Action for Canadian application 2840867 dated Jul. 16, 2015, 3 pages.
Office Action for German application 112011105403.3 dated Dec. 5, 2014, 14 pages including English translation.
Office Action for Japanese application 2014-518541 mailing date Dec. 24, 2014, 11 pages including English translation.
Office Action for Japanese application 2014-518541 mailing date Jun. 16, 2015, 4 pages including English translation.
Office Action for Korean application 2014-7002378 dated Apr. 20, 2015, 11 pages including English translation.
Samsung, "R-PDCCH REG/CCE Mapping onto PRBs", 3GPP TSG RAN WG1 #62bis R1-105403, Oct. 2010, pp. 4, Agenda #6.6.4, Xian, China.
Search Report for European application 11869043.7 dated Apr. 24, 2015, 8 pages.
International Preliminary Report on Patentability with Written Opinion for PCT Patent Application No. PCT/US2011/066166, mailed on Jan. 16, 2014, 6 Pages.
Intel Corporation, "Discussions on UE-RS Based PDCCH", 6.3.2.2, 3GPP TSG RAN WG1 Meeting #65, R1-111594, Barcelona, Spain, May 9-13, 2011, 3 Pages.
3GPP, "3rd Generation Partnership Project", Technical Specification Group Radio Access Network, Evolved Universal Terrestrial Radio Access (E-UTRA); Physical layer for relaying operation, 3GPP TS 36.216 V10.0.0, Release 10 (Sep. 2010), 12 Pages.
3GPP, 3rd Generation Partnership Project, Technical Specification Group Radio Access Network; Evolved Universal Terrestrial Radio Access (E-UTRA);Physical layer procedures, Release 9, 3GPP TS 36.213 V9.2.0 (Jun. 2010), 80 Pages.
International Search Report and Written Opinion received for PCT application No. PCT/US2011/066166, mailed on Sep. 28, 2012, 9 Pages.
"Control channel design for the support of wider bandwidth for LTE-Advanced", Nortel Networks,TSG-RAN1 #56, R1-090759, Athens, Greece, Feb. 9-13, 2009, 10 Pages.
Rapporteur, "Summary of Relay Email Discussion [59-12-LTE-A]: R-PDCCH", 3GPP TSG RAN WG1 R1-100380, Discussion, Jan. 2010, pp. 20, Meeting 59bis, Agenda 7.5, Valencia, Spain.
Ericsson et al, "Enhancements for UE specific control signaling", 3GPP TSG-RAN WG1 Tdoc R1-111332, May 2011, 3 pages, Meeting 65, Agenda 6.3.2.2, Barcelona, Spain.

* cited by examiner

MAPPING AN ENHANCED PHYSICAL DOWNLINK CONTROL CHANNEL

CLAIM OF PRIORITY

Priority of U.S. Provisional patent application Ser. No. 61/504,054, filed Jul. 1, 2011, is claimed and is hereby incorporated by reference.

BACKGROUND

Wireless mobile communication technology uses various standards and protocols to transmit data between a base transceiver station (BTS) and a wireless mobile device. In the third generation partnership project (3GPP) long term evolution (LTE) systems, the BTS is a combination of an evolved Node Bs (eNode Bs or eNBs) and Radio Network Controllers (RNCs) in a Universal Terrestrial Radio Access Network (UTRAN), which communicates with the wireless mobile device, known as a user equipment (UE). Data is transmitted from the eNode B to the UE via a physical downlink shared channel (PDSCH). A physical downlink control channel (PDCCH) is used to transfer downlink control information (DCI) that informs the UE about resource allocations or scheduling related to downlink resource assignments on the PDSCH, uplink resource grants, and uplink power control commands The PDCCH can be transmitted prior the PDSCH in each subframe transmitted from the eNode B to the UE.

The PDCCH signal is designed to be demodulated at the UE based on a cell specific reference signal (CRS). However, the use of a CRS does not take into account the increased complexities of advanced LTE systems. For instance, in heterogeneous networks, multiple nodes can simultaneously transmit within a single cell. The use of the cell specific reference signal can limit advanced techniques to increase cell capacity.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
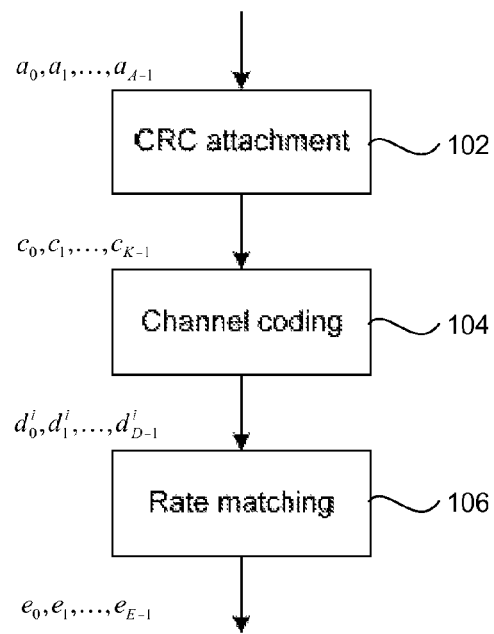
FIG. 1 illustrates a block diagram showing processes performed on downlink control information (DCI) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.
Example Embodiments An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). A downlink (DL) transmission can be a communication from the transmission station (or eNodeB) to the wireless mobile device (or UE), and an uplink (UL) transmission can be a communication from the wireless mobile device to the transmission station.

In homogeneous networks, the transmission station, also called macro nodes, can provide basic wireless coverage to mobile devices in a cell. Heterogeneous networks (HetNets) were introduced to handle the increased traffic loads on the macro nodes due to increased usage and functionality of mobile devices. HetNets can include a layer of planned high power macro nodes (or macro-eNBs) overlaid with layers of lower power nodes (micro-eNBs, pico-eNBs, femto-eNBs, or home eNBs [HeNBs]) that can be deployed in a less well planned or even entirely uncoordinated manner within the coverage area of the macro nodes. The macro nodes can be used for basic coverage, and the low power nodes can be used to fill coverage holes, to improve capacity in high usage locations or at the boundaries between the macro nodes' coverage areas, and improve indoor coverage where building structures impede signal transmission.

The deployment of a HetNet can improve the efficiency of the transmission of data to a UE in a cell, such as data communicated on a physical downlink shared channel (PDSCH). The efficiency is increased by splitting the cell into smaller areas with the additional use of low power nodes.

The communication of data on the PDSCH is controlled via a control channel, referred to as a physical downlink control channel (PDCCH). The PDCCH can be used for downlink (DL) and uplink (UL) resource assignments, transmit power commands, and paging indicators. The downlink PDSCH scheduling grant can be designated to a particular UE for dedicated PDSCH resource allocation to carry UEspecific traffic, or it can be designated to all UEs in the cell for common PDSCH resource allocation to carry broadcast control information such as system information or paging.

The data carried on the PDCCH is referred to as downlink control information (DCI). There are several traditional formats that are defined for a DCI message. Defined formats include:

Format 0 for transmission of uplink shared channel (UL-SCH) allocation;

Format 1 for transmission of downlink shared channel (DL-SCH) allocation for Single Input Multiple Output (SIMO) operation;

Format 1A for compact transmission of DL-SCH allocation for SIMO operation or allocating a dedicated preamble signature to a UE for random access;

Format 1B for transmission control information of Multiple Input Multiple Output (MIMO) rank 1 based compact resource assignment;

Format 1C for very compact transmission of PDSCH assignment; Format 1D, the same as format1B with additional information of power offset; Format 2 and Format2A for transmission of DL-SCH allocation for closed and open loop MIMO operation, respectively; and Format 3 and format 3A for transmission of TPC command for an uplink channel.

This list is not intended to be complete. Additional formats may also be used. As the complexity of wireless networks increases, such as the use of HetNets having multiple different types of nodes, other formats can be created to carry the desired downlink control information.

Multiple UEs can be scheduled in one subframe of a radio frame. Therefore, multiple DCI messages can be sent using multiple PDCCHs. The DCI information in a PDCCH can be transmitted using one or more control channel elements (CCE). A CCE is comprised of a group of resource element groups (REGs). A legacy CCE can include up to nine REGs. Each REG is comprised of four resource elements. Each resource element can include two bits of information when quadrature modulation is used. Therefore, a legacy CCE can include up to 72 bits of information. When more than 72 bits of information are needed to convey the DIC message, multiple CCEs can be employed. The use of multiple CCEs is referred to as aggregation level. 3GPP LTE Releases 8, 9 and 10 define aggregation levels as 1, 2, 4 or 8 consecutive CCEs allocated to one PDCCH.

To create the PDCCH payload, the DCI can undergo a number of processes, as illustrated in FIG. 1. The processes can include the attachment of a cyclic redundancy check 102 used for error detection in the DCI message; channel coding 104 for use in forward error correction, and rate matching 106 that is used to output a bit stream with a desired code rate. Detailed instructions for performing the cyclic redundancy check, channel coding, and rate matching are provided in the 3GPP LTE specifications, such as Release 8, 9 and 10.

Figure 2:
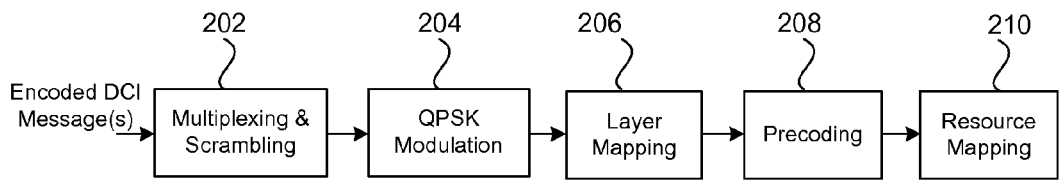
FIG. 2 illustrates a block diagram showing additional processes performed on downlink control information (DCI) in accordance with an example.

The encoded DCI message(s) for each control channel can then be multiplexed and scrambled before undergoing modulation, layer mapping, precoding and resource mapping, as illustrated in the block diagram of FIG. 2.

Blocks of encoded bits for each control channel can be multiplexed 202 in order to create a block of data. The size of the blocks of data may be altered to ensure that PDCCHs start at a desired CCE position. The size of the blocks of data may also be altered to ensure that the blocks of bits match the amount of REGs that can be used by the PDCCH. The multiplexed block of bits can then be scrambled. One scrambling process that is currently used is the use of a bit-wise XOR operation with a cell specific scrambling sequence. Other types of scrambling may be used as well. The encoding process is outlined in the 3GPP LTE specification.

The scrambled bits can then undergo modulation 204. Quadrature Phase Shift Keying (QPSK) is often used to create a block of complex-valued modulation symbols. Other types of modulation, such as Bi-Phase Shift Keying (BPSK), 16 Quadrature Amplitude Modulation (16-QAM), 32-QAM, 64-QAM, and so forth can also be used.

The complex symbols can be mapped 206 to multiple layers, depending on a number of transmit antennas used at the eNode B. One, two or four layer mapping has been used in legacy systems. Additional layers, such as eight layer mapping may also be used. The mapping process is outlined in the 3GPP LTE specification.

A precoder 208 can take a block from the layer mapper 206 to generate an output for each antenna port. Precoding for transmit diversity can be performed for two or four antennas in legacy systems based on the 3GPP LTE Rel. 8 specification. Transmission diversity for more complex systems, such as an eNode B with eight antennas, can also be applied using precoding. One common scheme used for precoding includes the Alamouti scheme for two antennas.

The complex valued symbols for each antenna can then be divided into groups for mapping 210 to resource elements. In legacy systems, the complex valued symbols for each antenna can be divided into quadruplets. The sets of quadruplets can then undergo a permutation such as interleaving and cyclic shifting before being mapped to resource elements within resource element groups.

The PDCCH can be transmitted prior to the PDSCH in each subframe transmitted from the eNode B to the UE. The demodulation of the PDCCH at the UE can based on a cell-specific reference signal (CRS). Each cell is only assigned a single reference signal. However, the use of the single CRS can limit the number of nodes that can be deployed in a cell.

A UE can receive a PDCCH using blind decoding. The resources used by the UE for PDCCH blind decoding can be referred to as the search space. A different search space can be used to detect and demodulate a PDCCH for a UE specific reference signal (UE-RS) relative to the use a CRS.

Figure 3:
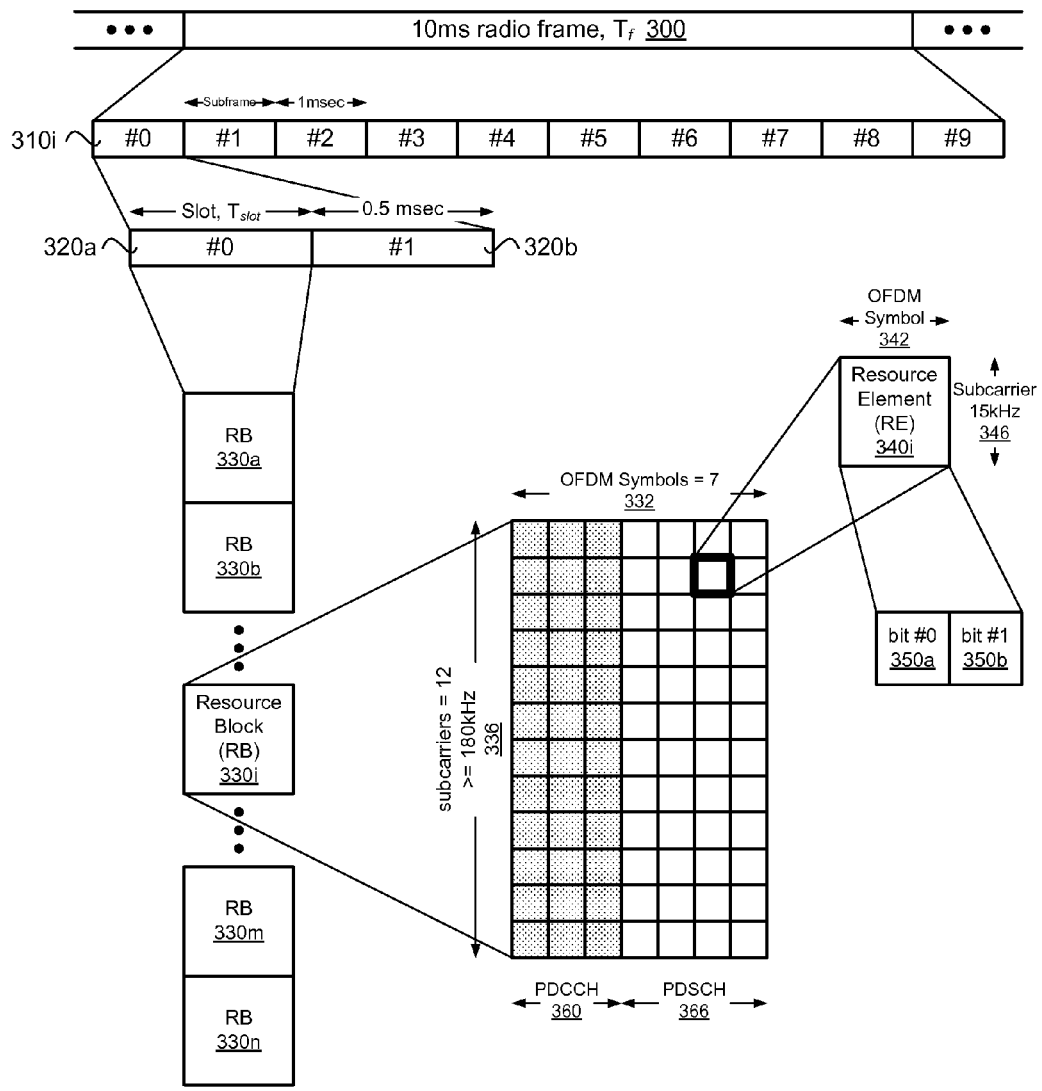
FIG. 3 illustrates a block diagram of a resource grid in accordance with an example.

The signal on the physical (PHY) layer used to convey the PDCCH can be transmitted by the eNode B (enhanced Node B or evolved Node B or eNB) to the user equipment (UE) using a generic long term evolution (LTE) frame structure, as illustrated in FIG. 3. In the illustration of FIG. 3, a legacy PDCCH is illustrated.

A radio frame 300 can have a duration, $T_f$, of 10 milliseconds (ms). Each radio frame can be segmented or divided into ten subframes 310i that are each 1 ms long. Each subframe can be further subdivided into two slots 320a and 320b, each with a duration, $T_{slot}$, of 0.5 ms. In a legacy system, the first slot (#0) 320a can include a physical downlink control channel (PDCCH) 360 and a physical downlink shared channel (PDSCH) 366, and the second slot (#2) 320b can include data using the PDSCH. Each slot for a component carrier (CC) used by the eNode B and the UE can include multiple resource blocks (RBs) 330a, 330b, 330i, 330m, and 330n based on the CC frequency bandwidth.

Each RB 330i can include 12-15 kHz subcarriers 336 (on the frequency axis) and 6 or 7 orthogonal frequency-division multiplexing (OFDM) symbols 332 (on the time axis) per subcarrier. In one embodiment, the RB can use seven OFDM symbols if short or normal cyclic prefix is employed. In another embodiment, the RB can use six OFDM symbols if an extended cyclic prefix is used. The resource block can be mapped to 84 resource elements (REs) 340i using short or normal cyclic prefixing, or the resource block can be mapped to 72 REs (not shown) using extended cyclic prefixing. The RE can be a unit of one OFDM symbol 342 by one subcarrier (i.e., 15 kHz) 346. Each RE can transmit two bits 350a and 350b of information using QPSK. The actual number of bits communicated per RE is dependent on the level of modulation used.

The control region of each legacy serving cell in carrier aggregation consists of a set of (CCEs). In one embodiment, the CCEs can be numbered from 0 to $N_{CCE,k}$-1, where $N_{CCE,k}$ is the total number of CCEs in the control region of subframe k. The UE can monitor a set of PDCCH candidates on one or more activated serving cells as configured by higher layer signaling for control information. The term monitoring, as used herein, implies attempting, at the UE, to decode each of the PDCCH candidates in the set according to all of the monitored DCI formats.

A physical control channel can be transmitted on an aggregation of one or several CCEs. The CCE(s) have traditionally been transmitted consecutively. As previously discussed, a legacy control channel element corresponds to 9 resource element groups (REGs). Each legacy REG is comprised of four resource elements. In one embodiment, the number of REGs that are not assigned to a physical control format indicator channel (PCFICH) or a physical hybrid automatic repeat request (ARQ) indicator channel (PHICH) is denoted $N_{REG}$. The CCEs available in a 3GPP LTE system can be numbered from 0 to $N_{CCE}$-1, where $N_{CCE}=(N_{REG}/9)$. The PDCCH can support multiple formats. Multiple PDCCHs can be transmitted in a subframe. One example of PDCCH formats is provided in the following table.

TABLE 1

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The currently described PDCCH transmission and mapping process, as described by the 3GPP LTE Release 8, 9 and 10 specifications, can create limitations to advances that are made in other areas of wireless communication. For example, mapping of CCEs to subframes in OFDM symbols is typically spread over the control region to provide spatial diversity. However, no beam forming diversity is possible with the current mapping procedures. In addition, interference coordination with neighboring cells is typically not possible using current mapping procedures since orthogonality cannot be guaranteed among neighboring cells, thereby resulting in potential subcarrier collisions occurring.

Moreover, the capacity of the legacy PDCCH design may not be sufficient for future networks. For instance, future networks may be configured HetNets that can include a number of different kinds of transmission nodes in a single macro cell serving area. More UEs can be served simultaneously by macro and pico cells in the HetNet. The 3GPP LTE Rel. 8 PDCCH is designed to demodulate based on cell-specific reference signals, which makes it difficult to fully explore cell splitting gain. The PDCCH design may not be adequate to convey the information needed to allow a UE to take advantage of the multiple transmission nodes in the HetNet to increase bandwidth and decrease battery usage at the UE.

In addition, the use of multi-user multiple-input multiple-output (MU-MIMO), machine to machine communication (M2M), PDSCH transmission in a multicast\broadcast single-frequency network, and cross carrier scheduling in carrier aggregation can require increased capacity for the PDCCH. The use of UE specific reference signals in PDCCH demodulation at the UE can allow the use of multiple nodes in a HetNet. Rather than relying on a single common reference symbol for an entire cell, each reference symbol can be UE specific.

Accordingly, an extended PDCCH (ePDCCH) can be configured with increased capacity to allow advances in the design of cellular networks and to minimize currently known challenges. Several examples of ePDCCH design and mapping principals will be provided. The examples are not intended to be limiting. Because of the broad design aspects of a ePDCCH, including but not limited to CRC attachment, channel coding, rate matching, multiplexing, scrambling, modulation, layer mapping, precoding, resource mapping, and search space requirements, the examples provided are not intended to provide a complete system. However, the examples can provide improvements upon which other aspects of an ePDCCH design and implementation can be expanded on.

Figure 4:
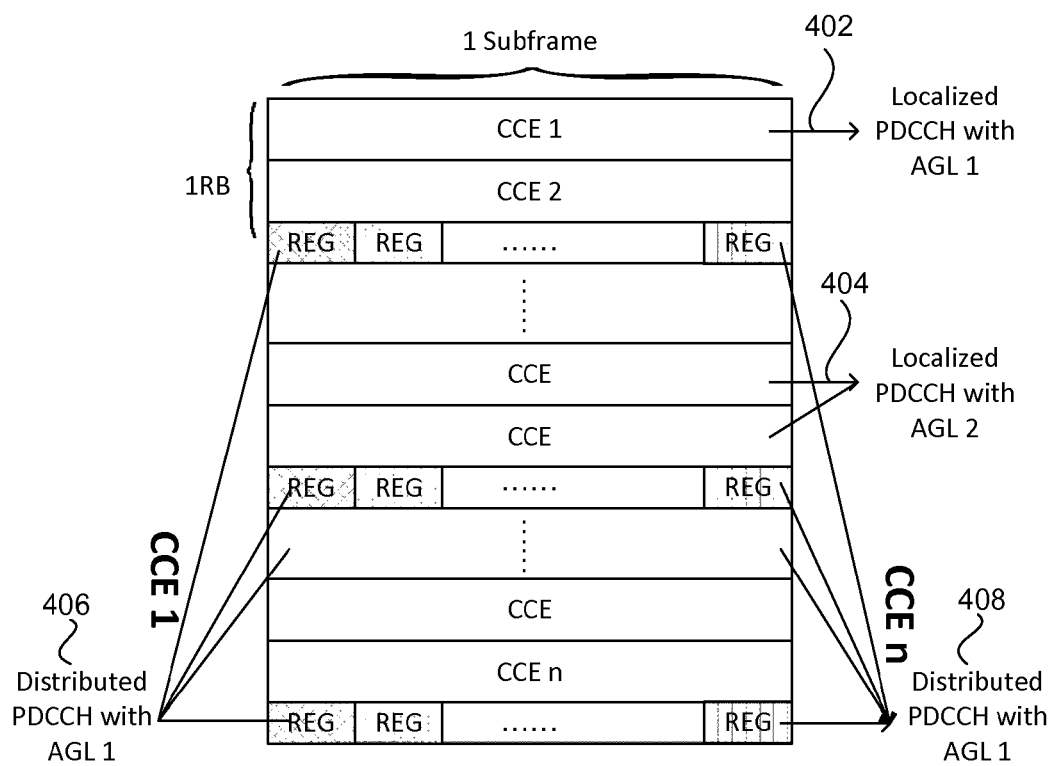
FIG. 4 illustrates a block diagram of an enhanced physical downlink control channel (ePDCCH) mapped to a subframe in accordance with an example.

FIG. 4 provides one example of an ePDCCH that is mapped into CCEs, with the CCEs mapped to resource elements in a subframe. In this example, each resource block pair can comprise two resource blocks, each having the same subcarriers, located in a first and second slot in a subframe of a radio frame, as shown in FIG. 3. Each resource block can include one CCE. The CCE may be in a defined location within the resource block. However, the CCE may include resource element groups (REGs) that are located throughout the resource block. Each REG may include four resource elements. However, based on system requirements, a REG may include more or less resource elements. In this example, the resource elements located in a REG are contiguous in at least one of frequency and time. The number of REGs in a CCE may be a fixed number, such as nine. Alternatively, the number of REGs may vary based on DCI data load requirements (I.e. the amount of DCI data), or other competing requirements in the resource block, such as PCFICH requirements, PHICH requirements, and resource symbol requirements for data allocated within each resource block. In one embodiment, channel control elements can be mapped to resource elements in a single resource block pair in the subframe. The control channel element can be mapped in frequency and time to the resource elements in the single resource block pair. The resource elements to which the control channel elements are mapped to in the resource block pair may be contiguous in time and/or frequency. Alternatively, the resource elements may be separated in time and/or frequency. The control channel element may be mapped across a slot boundary in the physical resource block pair.

In FIG. 4, a localized ePDCCH 402 having aggregation level (AGL) one is shown.

The localized ePDCCH can be mapped to a single CCE, which can be mapped to a single resource block, as can be appreciated. Similarly, a localized ePDCCH 404 with an aggregation level of two may be mapped to two contiguous CCEs in a resource block. However, this can lead to many of the same challenges as exist in legacy systems, such as the inability to create random beam forming diversity, no interference coordination with neighboring cells, and so forth.

To overcome these problems, one process that may be used is to map an ePDCCH to one or more CCEs. The CCE(s) can then be mapped to a plurality of REGs in different resource blocks. The frequency separation of the REGs can provide frequency diversity gain. Each REG in a CCE may be mapped to a separate resource block, although more than one REG may be mapped to a same resource block as another REG. The more widely distributed the REGs are, the greater the diversity gain that can occur.

In one embodiment, each REG can be distributed to resource blocks that are separated from another resource block containing a REG for the CCE by a frequency that is at least five times a coherent bandwidth of the PDCCH carrier frequency. However, the ability to separate the REGs in frequency can depend on a specific channel profile and system bandwidth. In instances where a relatively narrow bandwidth is available, each REG may only be separated by two times the coherent bandwidth of the PDCCH carrier frequency. In another embodiment, a REG may be separated from another REG in a CCE by a single resource block. Overall, each REG can be separated in frequency from other REGs in a CCE as far as possible to gain frequency diversity.

FIG. 4 contains one example of a distributed PDCCH 406 having an aggregation level of one. The aggregation level of one implies that the DCI information is able to be mapped to a single CCE. The CCE may contain 9 REGs. However, a lesser or a greater number of REGs may be used in each CCE. If a different modulation scheme than QPSK is used on the DCI information, a greater number of REs and/or bits may be contained in each REG The REGs in the CCE can be mapped to resource blocks in a subframe that are separated in frequency as much as possible, depending on the channel profile and system bandwidth to provide frequency diversity gain. Similarly, the REGs for CCE N 408 are distributed in frequency. The REGs in CCE 1 and CCE N may have the same distribution or different distribution amongst resource blocks in a subframe. While the REGs illustrated in the distributed PDCCH 406 and 408 are each shown to be in the same time position within a resource block, for each respective CCE, this is not required. The distributed REGs in CCE 1 and CCE N may be in a different temporal location within a resource block. Each CCE in a subframe may have a same number of REGs or a different number of REGs.

The distribution of the REGs in a CCE over frequency to different resource blocks in a subframe can provide an increase in frequency diversity gain. In addition, different frequency mapping schemes can be used in neighboring transmission stations that can significantly reduce or eliminate potential subcarrier collisions occurring for mobile devices operating near a cell edge of the neighboring transmission stations. Moreover, the frequency distributed ePDCCH can allow the use of random beam forming diversity to provide additional gain, thereby increasing the distance and/or bit rate at which the ePDCCH can be communicated.

Figure 5:
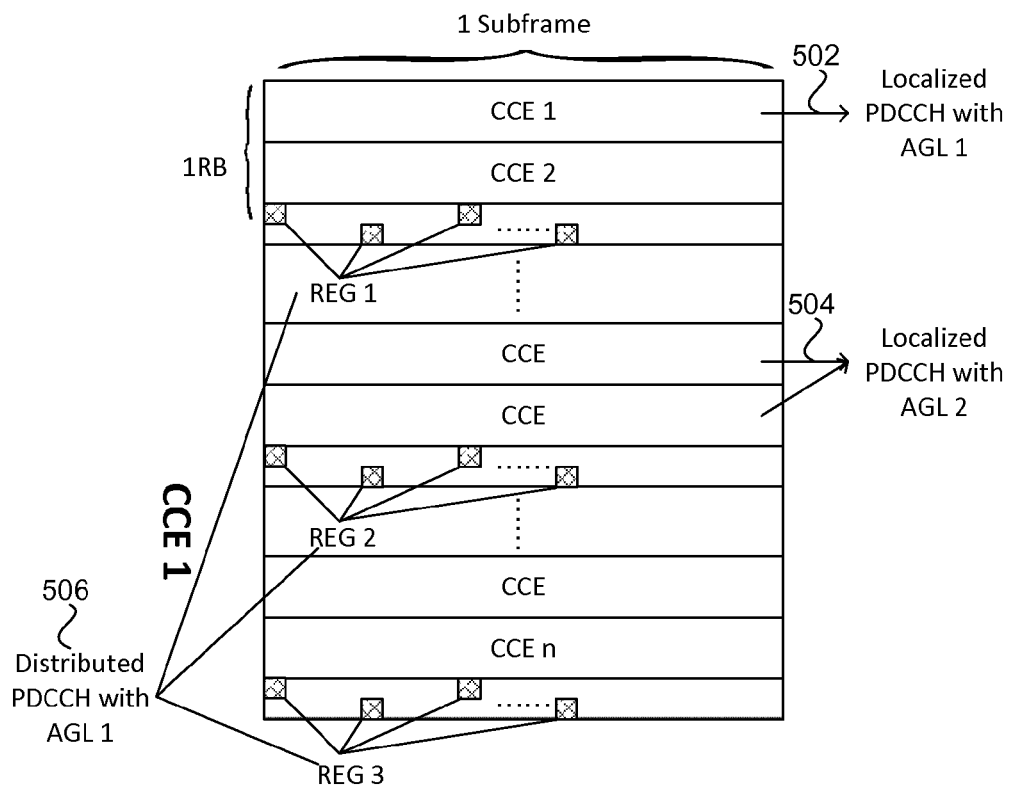
FIG. 5 illustrates a block diagram of an enhanced physical downlink control channel (ePDCCH) mapped to a subframe in accordance with an additional example.

FIG. 5 provides another example of a process for mapping a CCE to resource elements and/or resource blocks in a subframe of a radio frame. The localized ePDCCH examples 502, 504 with aggregation levels 1 and 2, respectively, can be substantially similar to the examples 402, 404 in FIG. 4. The distributed ePDCCH 506 with aggregation level one in CCE 1 is shown to be distributed both in frequency and time. In addition, the REGs are divided into sub-groups that can be distributed in time and space within a resource block group. A REG having resource elements that are distributed in both time and frequency can be referred to as a distributed REG.

In one embodiment, each distributed REG can include from four to 16 resource elements. Each resource element may include from 1 to 8 bits. The resource elements in a distributed REG are mapped to selected locations in a resource block and/or resource block pair. In one embodiment, all of the resource elements in a distributed REG can be contained in the same resource block. Alternatively, the resource elements in a distributed REG may be mapped to more than one resource block pair in a subframe.

In one example, legacy PDCCH mapping values can be used. The distributed ePDCCH 506 may include nine REGs which each contain four resource elements, with each resource element containing two bits. The distributed ePDCCH can be mapped to nine separate resource blocks, with each resource block including one distributed REG Each distributed REG can include four resource elements that are distributed throughout the resource block. For a PDCCH with a greater aggregation level, the PDCCH can be mapped to additional CCEs that can be similarly distributed. A precoder that is in the same CCE in the same resource block can be applied to the REG to realize some random beam forming, thereby providing spatial diversity gain. UEs can also utilize this kind of structure to decode in different search space categories that depend on the mobility of the UE's themselves. This can be used to decrease blind decoding attempts. This example is not intended to be limiting. As previously discussed, the CCE in an ePDCCH can include a greater (or lesser) number of REGs, each REG may contain a greater number of resource elements, and each resource element may contain a greater number of bits, depending on the type of modulation used.

The set of ePDCCH candidates to monitor are defined in terms of search spaces, where a search space $S_k^{(L)}$ at aggregation level $L \in \{1,2,4,8\}$ is defined by a set of ePDCCH candidates. For each serving cell on which ePDCCH is monitored, the CCEs corresponding to ePDCCH candidate m of the search space $S_k^{(L)}$ are given by:

$$L\{(Y_k+m') \bmod \lfloor N_{CCE,k}/L \rfloor\}+i$$

where $Y_k$ is defined below, $i=0, \ldots, L-1$. For the common search space $m'=m$. If the monitoring UE, for a UE specific search space, is configured with a carrier indicator field then $m'=m+M^{(L)} \cdot n_{CI}$ where $n_{CI}$ is the carrier indicator field value. If the monitoring UE, for a UE specific search space, is not configured with a carrier indicator field then $m'=m$, where $m=0, \ldots, M^{(L)}-1$. $M^{(L)}$ is the number of ePDCCH candidates to monitor in the given search space.

A UE specific search space can be configured that takes into account both low mobility and high mobility UEs. High mobility UEs can have a larger Doppler shift, move between cells more often, and require more frequent data exchanges with an eNode B in order to maintain fresh data such as reference signal information.

For low mobility, frequency scheduling gain can be achieved using localized ePDCCH search space candidates, such as localized ePDCCH 402 and 404 in FIG. 4. For high mobility, search space candidates can be distributed widely across different frequency sub-bands in the OFDMA signal, such as in the distributed ePDCCH 406 and 408 in FIG. 4 or 506 in FIG. 5. The wide distribution of the search space candidates in the OFDMA signal can provide a scheduling gain caused by the reception of reliable channel state information feedback from the UE to the eNode B. For high mobility, the search space can be configured to allow open loop (OL) multiple-input multiple output (MIMO) to be implemented with UE specific reference signals for the ePDCCH.

Based on the examples illustrated in FIGS. 4 and 5, a number of design principles for an ePDCCH can be derived. An ePDCCH can be mapped into either one or multiple control channel elements. When one ePDCCH is mapped into multiple CCEs, each CCE may be used to decode an ePDCCH. One CCE can be mapped to resource elements within one physical resource block (RB) or RB pair. One CCE can be mapped to distributed resource blocks that are relatively far apart in the frequency domain. A localized ePDCCH can be mapped to multiple localized CCEs. The localized CCEs can be mapped within one resource block, or to multiple resource blocks that are contiguous in the frequency domain. A distributed ePDCCH can be mapped to one CCE or multiple distributed CCEs. The localized CCEs can be mapped to distributed resource blocks that are distributed as far apart from each other in the frequency domain as is possible based on the channel, system bandwidth, and other system considerations, as can be appreciated. One subframe can contain either localized CCEs, distributed CCEs, or both. One physical resource block can also contain either localized CCEs or part of a distributed CCE or both. The resource elements to which the CCE is mapped can exclude those that are assigned to reference symbols or other overhead.

After the number of cell specific reference signal ports, demodulation specific reference signal ports, channel state information reference signal ports are configured in a resource block by a higher layer, such as radio resource control (RRC) signaling, a CCE can be indexed based on the available resource elements in the resource blocks that are assigned for ePDCCH transmission.

In one embodiment, for ePDCCH signals received from relatively low mobility UEs, localized CCEs can be indexed based on the order in frequency, as illustrated in FIG. 1. In another embodiment, for ePDCCH signals received from relatively high mobility UEs, the CCE can be indexed to resource elements that are either: contiguous in time or frequency, as shown in FIG. 1; or distributed in time and frequency, as shown in FIG. 2. The use of the distributed REGs in FIG. 2 can provide more diversity gain, especially for an ePDCCH with a low aggregation level. For high mobility UEs, the CCE can be indexed to resource elements as previously discussed for the distributed PDCCH 406 and 408 in FIG. 4.

In one embodiment, CCEs may be indexed into REGs that are divided into two categories, depending on their function: one set of REGs for low mobility, and another set of REGs for high mobility. For each category, the search space can be defined where a ePDCCH candidate m=0, 1, ... M(Λ)−1 at aggregation level Λ comprises a CCE numbered with $n_{cce}^{PDCCH}=(\Lambda \times m+i) \mod M_{CCE}^{PDCCH}$ is the total number of CCEs for the selected category, i=0, 1, ..., Λ+1 and M(Λ) is a number of ePDCCH candidates based on the aggregation level Λ. One example of ePDCCH candidates based on aggregation level is shown in Table 1, below. Additional ePDCCH candidates based on aggregation levels may also be employed, as can be appreciated.

TABLE 1

| Aggregation level Λ | Number of ePDCCH candidates M(Λ) |
| --- | --- |
| 1 | 6 |
| 2 | 6 |

TABLE 1-continued

| Aggregation level Λ | Number of ePDCCH candidates M(Λ) |
| --- | --- |
| 4 | 2 |
| 8 | 2 |

Figure 6:
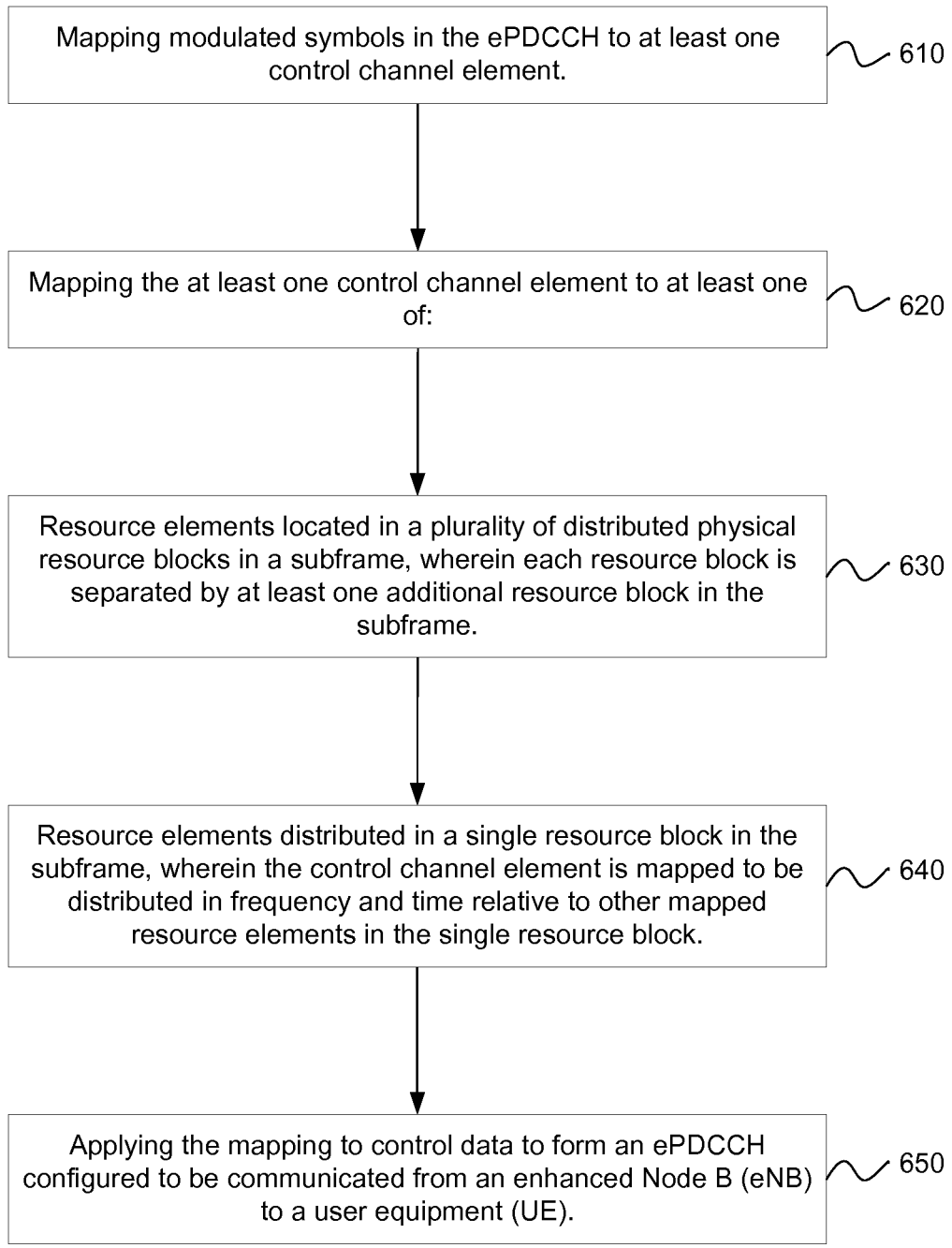
FIG. 6 illustrates a flow chart depicting a method for mapping an enhanced physical downlink control channel (ePDCCH) to physical resource blocks in a radio frame in accordance with an example.

In one example, FIG. 6 provides a flow chart that depicts a method for mapping an enhanced physical downlink control channel (ePDCCH) to physical resource blocks in a radio frame. The method comprises mapping modulated symbols in the ePDCCH to at least one control channel element, as shown in block 610. The at least one control channel element can be mapped 620 to at least one of: resource elements located in a plurality of physical resource blocks in a subframe, wherein each resource block is separated by at least one additional resource block in the subframe; and resource elements distributed in a single resource block in the subframe, wherein the control channel element is mapped to be distributed in frequency and time relative to other mapped resource elements in the single resource block, as shown in blocks 630 and 640, respectively. The method 600 further comprises applying the mapping to control data to form an ePDCCH configured to be communicated from an enhanced Node B to a UE, as shown in block 650.

The method 600 can also include mapping the at least one control channel element to resource elements in a single resource block pair in the subframe. The control channel element can be distributed in frequency and time to the resource elements in the single resource block pair. In addition, the modulated symbols in the ePDCCH can be mapped to the single resource block pair, wherein the control channel element is mapped across a slot boundary in the physical resource block pair.

Another example in the method 600 comprises mapping the at least one control channel element to resource elements located in the plurality of physical resource blocks in the subframe, wherein each resource block is contiguous in frequency. The at least one control channel element can be mapped to the resource elements located in the subframe and to the single resource block in the subframe. The single resource block can contain both contiguous resource elements and resource elements that are distributed in frequency and time to which the control channel element is mapped.

The method 600 further comprises mapping symbols in a localized ePDCCH to a plurality of control channel elements; and mapping the plurality of control channel elements to physical resource blocks that are contiguous in the subframe. The at least one control channel element can be mapped to the resource elements located in the plurality of physical resource blocks in the subframe. The resource elements can be grouped into a plurality of resource element groups. Each resource element group can consist of four resource elements that are contiguous in at least one of time and frequency.

The method 600 also includes forming distributed resource element groups in one of the plurality of physical resource blocks and the single resource block. Each distributed resource element group consists of at least four resource elements that are distributed in time and frequency within a resource block.

The method 600 additionally includes forming an individual index of the at least one control channel elements that are mapped to the resource elements in the resource blocks in the subframe of a radio frame. A global index of the at least one control channel elements that are mapped to the resource elements in the resource blocks in the subframe is also disclosed.

In another embodiment, an article is disclosed. The article comprises a non-transitory computer-readable storage medium containing instructions that, if executed by a processor, enable a system to apply mapping to control data operable to form an extended physical downlink control channel (ePDCCH) configured to be communicated from an enhanced Node B (eNB) to a user equipment (UE) in a radio frame. The mapping is formed by mapping modulated symbols in the ePDCCH to at least one of at least one localized control channel element and at least one distributed control channel element, wherein: the at least one localized control channel element is mapped within a physical resource block or multiple physical resource blocks that are contiguous in the frequency domain on a subframe of the radio frame; and the at least one distributed control channel element is mapped to distributed resource elements in at least one physical resource block in the subframe of the radio frame.

The article can further comprise instructions that when executed by a processor enable the system to apply mapping to control data operable to form the ePDCCH configured to be communicated from the eNB to the UE in the radio frame. The mapping can be formed by mapping the modulated symbols in the ePDCCH to the at least one distributed control channel element that is mapped to multiple localized physical resource blocks that are distributed in frequency in the subframe.

The article can further comprise instructions that when executed by a processor enable the system to apply mapping to control data operable to form the ePDCCH configured to be communicated from the eNB to the UE in the radio frame. The mapping can be formed by mapping the at least one localized control channel element and the at least one distributed control channel element to physical resource blocks in the subframe of the radio frame. The subframe can include at least one of the mapped localized control channel elements and the at least one mapped distributed control channel element.

The article can further comprise instructions that when executed by a processor enable the system to apply mapping to control data operable to form the ePDCCH configured to be communicated from the eNB to the UE in the radio frame. The mapping can be formed by mapping the at least one localized control channel element and the at least one distributed control channel element to a physical resource block in the subframe of the radio frame, wherein the at physical resource block includes at least one of the mapped localized control channel elements and at least one of the mapped distributed control channel elements.

In another embodiment, an apparatus is disclosed that comprises an enhanced Node B (eNB) operable to apply mapping to control data operable to form an extended physical downlink control channel (ePDCCH) configured to be communicated to a user equipment (UE) in a radio frame. The mapping is formed by mapping modulated symbols in the ePDCCH to at least one of at least one localized control channel element and at least one distributed control channel element, wherein: the at least one localized control channel element is mapped within a physical resource block or multiple physical resource blocks that are contiguous in the frequency domain on a subframe of the radio frame; and the at least one distributed control channel element is mapped to distributed resource elements in at least one physical resource block in the subframe of the radio frame.

In another embodiment, the eNB can be further configured to apply mapping to control data operable to form the ePDCCH configured to be communicated from the eNB to the UE in the radio frame. The mapping can be formed by mapping the modulated symbols in the ePDCCH to the at least one distributed control channel element that is mapped to multiple localized physical resource blocks that are distributed in frequency in the subframe.

In another embodiment, the eNB can be further configured to apply mapping to control data operable to form the ePDCCH configured to be communicated from the eNB to the UE in the radio frame. The mapping can be formed by mapping the at least one localized control channel element and the at least one distributed control channel element to physical resource blocks in the subframe of the radio frame, wherein the subframe includes at least one of the mapped localized control channel element and the mapped distributed control channel element.

In another embodiment, the eNB can be further configured to apply mapping to control data operable to form the ePDCCH configured to be communicated from the eNB to the UE in the radio frame. The mapping can be formed by mapping the at least one localized control channel element and the at least one distributed control channel element to a physical resource block in the subframe of the radio frame, wherein the physical resource block includes at least one of the mapped localized control channel elements and at least one of the mapped distributed control channel elements.

Figure 7:
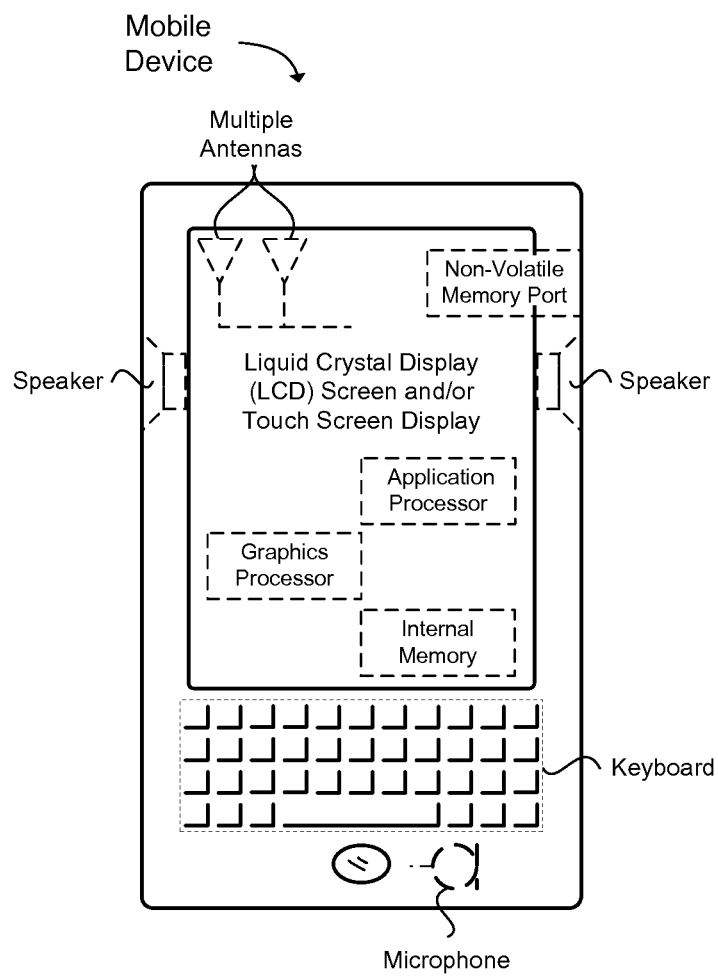
FIG. 7 illustrates an example of a block diagram of a mobile communication device in accordance with an example.

FIG. 7 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. While two antennas are shown, the mobile device may have between one and four or more antennas. The mobile device can be configured to communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of search spaces, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for mapping an enhanced physical downlink control channel (ePDCCH) to physical resource blocks in a radio frame at an enhanced Node B (eNB), comprising:
    mapping modulated symbols at the eNB in the ePDCCH to at least one control channel element (CCE);
    mapping the at least one CCE to resource elements (REs) located in a plurality of distributed physical resource blocks (PRBs) in a subframe of the radio frame, wherein each physical resource block is separated by at least one additional physical resource block in the subframe of the radio frame; and
    applying the mapping of the at least one CCE to the REs to control data for scheduling to form the ePDCCH configured to be communicated from the eNB to a user equipment (UE).

2. The method of claim 1, further comprising mapping the modulated symbols in the ePDCCH to at least one consecutive CCE.

3. The method of claim 1, further comprising mapping the at least one control channel element to resource elements located in the plurality of physical resource blocks in the subframe, wherein each physical resource block is contiguous in frequency.

4. The method of claim 1, further comprising mapping the at least one control channel element to the resource elements located in the plurality of physical resource blocks in the subframe and to a single physical resource block in the subframe, wherein the single physical resource block contains both contiguous resource elements and resource elements distributed in frequency and time to which the at least one control channel element is mapped.

5. The method of claim 1, further comprising forming an individual index of the at least one control channel elements that are mapped to the resource elements in the physical resource blocks in the subframe.

6. The method of claim 1, further comprising forming distributed resource element groups in one of the plurality of physical resource blocks, wherein each distributed resource element group consists of resource elements distributed in time and frequency.

7. The method of claim 1, further comprising applying the mapping to the control data for scheduling to form the ePDCCH configured to be communicated from the eNB to the UE, wherein the UE includes a microphone, an audio speaker, a liquid crystal display (LCD) screen, an organic light emitting display screen (OLED), a touch sensitive screen, or a non-volatile memory port.

8. An enhanced Node B (eNB) operable to apply mapping to control data operable to form an enhanced physical downlink control channel (ePDCCH) configured to be communicated to a user equipment (UE) in a radio frame, wherein the eNB comprises:

one or more processors and memory configured to:
map modulated symbols in the ePDCCH to at least one control channel element (CCE);
map the at least one CCE to resource elements located in a plurality of distributed physical resource blocks in a subframe of the radio frame and to a single physical resource block in the subframe of the radio frame, wherein the single physical resource block contains both contiguous resource elements and resource elements distributed in frequency and time to which the at least one control channel element is mapped; and
apply a mapping of the at least one CCE to the resource elements to control data for scheduling to form an ePDCCH configured to be communicated from the eNB to a user equipment UE.

9. The eNB of claim 8, wherein the modulated symbols in the ePDCCH are mapped to at least one consecutive CCE.

10. The eNB of claim 8, wherein the at least one control channel element is mapped to resource elements in a single physical resource block pair in the subframe, wherein the control channel element is mapped in frequency and time to the resource elements in the single physical resource block pair.

11. The eNB of claim 10, wherein the modulated symbols in the ePDCCH are mapped to the single physical resource block pair, wherein the control channel element is mapped across a slot boundary in the physical resource block pair.

12. The eNB of claim 8, further comprising an individual index of the at least one control channel elements that are mapped to the resource elements in the physical resource block in the subframe.

13. The eNB of claim 8, wherein the ePDCCH is configured to be communicated from the eNB to the UE, wherein the UE includes a microphone, an audio speaker, a liquid crystal display (LCD) screen, an organic light emitting display screen (OLED), a touch sensitive screen, or a non-volatile memory port.

14. An article, comprising a non-transitory computer-readable storage medium containing instructions that if executed by a processor in an enhanced Node B (eNB), enable a system to:
apply mapping to control data operable to form an enhanced physical downlink control channel (ePDCCH) configured to be communicated from the eNB, to a user equipment (UE) in a radio frame, wherein the mapping is formed, using the processor in the eNB, by:
mapping modulated symbols in the ePDCCH to at least one of at least one localized control channel element and at least one distributed control channel element, wherein:
the at least one localized control channel element is mapped within multiple distributed physical resource blocks that are contiguous in the frequency domain on a subframe of the radio frame; and
the at least one distributed control channel element is mapped to distributed resource elements in at least one physical resource block in the subframe of the radio frame.

15. The article of claim 14, further comprising instructions that when executed by a processor enable the system to:
apply mapping to control data operable to form the ePDCCH configured to be communicated from the eNB to the UE in the radio frame, wherein the mapping is formed by:
mapping the modulated symbols in the ePDCCH to the at least one distributed control channel element that is mapped to multiple localized physical resource blocks that are distributed in frequency in the subframe.

16. The article of claim 14, further comprising instructions that when executed by a processor enable the system to:
apply mapping to control data operable to form the ePDCCH configured to be communicated from the eNB to the UE in the radio frame, wherein the mapping is formed by:
mapping the at least one localized control channel element and the at least one distributed control channel element to physical resource blocks in the subframe of the radio frame, wherein the subframe includes at least one of the mapped localized control channel element and the at least one mapped distributed control channel element.

17. The article of claim 14, further comprising instructions that when executed by a processor enable the system to:
apply mapping to control data operable to form the ePDCCH configured to be communicated from the eNB to the UE in the radio frame, wherein the mapping is formed by:
mapping the at least one localized control channel element and the at least one distributed control channel element to a physical resource block in the subframe of the radio frame, wherein the at physical resource block includes at least one of the mapped localized control channel elements and at least one of the mapped distributed control channel elements.

18. An apparatus, comprising:
an enhanced Node B (eNB) operable to apply mapping to control data operable to form an enhanced physical downlink control channel (ePDCCH) configured to be communicated to a user equipment (UE) in a radio frame, wherein the apparatus comprises one or more processors and memory configured to:
map modulated symbols in the ePDCCH to at least one of at least one localized control channel element and at least one distributed control channel element, wherein:
the at least one localized control channel element is mapped within multiple distributed physical resource blocks that are contiguous in the frequency domain on a subframe of the radio frame; and
the at least one distributed control channel element is mapped to distributed resource elements in at least one physical resource block in the subframe of the radio frame.

19. The apparatus of claim 18, wherein the apparatus is further configured to:
apply mapping to control data operable to form the ePDCCH configured to be communicated from the eNB to the UE in the radio frame, wherein the mapping is formed by:
mapping the modulated symbols in the ePDCCH to the at least one distributed control channel element that is mapped to multiple localized physical resource blocks that are distributed in frequency in the subframe.

20. The apparatus of claim 18, wherein the apparatus is further configured to:
apply mapping to control data operable to form the ePDCCH configured to be communicated from the eNB to the UE in the radio frame, wherein the mapping is formed by:
mapping the at least one localized control channel element and the at least one distributed control channel element to physical resource blocks in the subframe of the radio frame, wherein the subframe includes at least one of the mapped localized control channel element and the mapped distributed control channel element.

21. The apparatus of claim 18, wherein the apparatus is further configured to:

apply mapping to control data operable to form the ePDCCH configured to be communicated from the eNB to the UE in the radio frame, wherein the mapping is formed by:

mapping the at least one localized control channel element and the at least one distributed control channel element to a physical resource block in the subframe of the radio frame, wherein the physical resource block includes at least one of the mapped localized control channel elements and at least one of the mapped distributed control channel elements.

* * * * *